July 26, 1966 D. L. GUNN 3,263,172

TRANSISTOR TRANSMITTER OUTPUT AMPLIFIER PROTECTION MEANS

Filed June 20, 1963

INVENTOR.
David L. Gunn

BY Mueller & Aichele

Attys.

United States Patent Office 3,263,172
Patented July 26, 1966

3,263,172

TRANSISTOR TRANSMITTER OUTPUT AMPLIFIER PROTECTION MEANS

David L. Gunn, Lombard, Ill., assignor to Motorola, Inc., Franklin Park, Ill., a corporation of Illinois Filed June 20, 1963, Ser. No. 289,304
3 Claims. (Cl. 325—151)

Figures 1, 2:
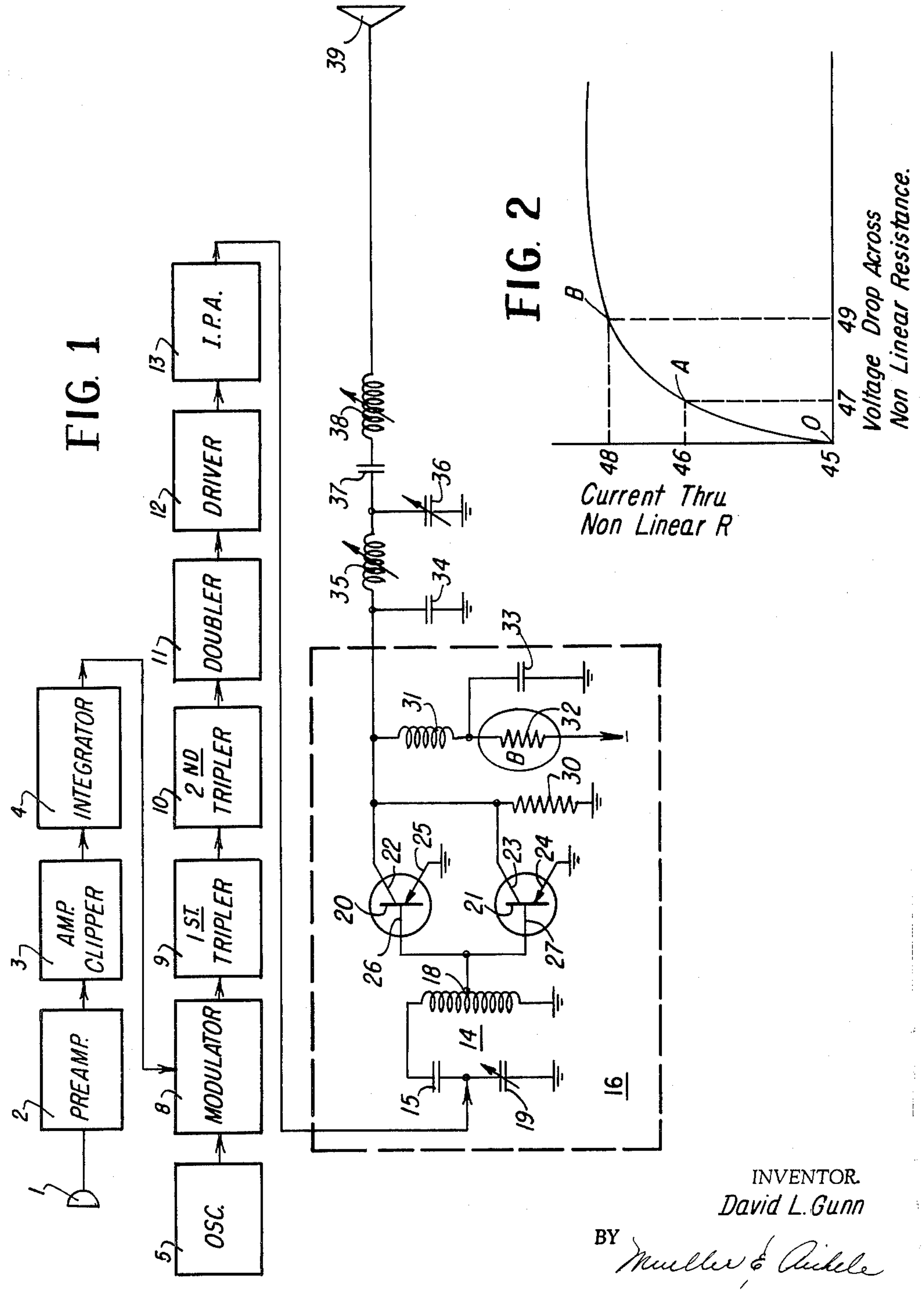

This invention relates to circuits for the protection of transistors and in particular to the protection of the output transistors of a miniature carrier wave transmitter.

The development of transistors and other semiconductor components has made possible the miniaturization of many electronic devices. One such device is a hand held radio transmitter. However, in order to achieve maximum efficiency of operation, it is necessary to operate the transistors of the miniature transmitter at their maximum ratings. This particularly applies to the power amplifier stages of the transmitter.

When such a miniature transmitter is operated in the vicinity of high powered transmitters the signals from the nearby transmitters may induce a voltage on the antenna of the miniature transmitter. This received voltage may be coupled back to the output transistors and added to the radio frequency voltage normally found at this point. This can occur even though the nearby high powered transmitter is transmitting on a different frequency than that to which the miniature transmitter is tuned. Since the voltage applied to the final amplifier stages of the miniature transmitter is as high as the ratings of the transistor will permit, the addition of the voltage induced on the antenna will cause the voltage appearing at the output of the power amplifier transistor to exceed the maximum ratings and the transistor may break down. When the transistor breaks down, a heavy current flows through the transistor causing it to burn out.

It is therefore an object of this invention to provide a protective device which will limit the current supplied to a transistor to a safe value.

Another object of this invention is to provide a protective device which will not be destroyed in limiting the current supplied to a transistor.

A further object of this invention is to provide a protective device which will limit the current supplied to a transistor to a safe value while keeping the output power of the transistor as high as possible.

A feature of this invention is the use of a non-linear resistance in series with the power supply to a transistor which operates when the transistor suffers a voltage breakdown, to prevent the destruction of the transistor. The non-linear resistance has a low value of resistance when the current drawn by the transistor is within the maximum current ratings of the transistor, and has a high value of resistance when the current drawn by the transistor exceeds the safe limits.

Another feature is the use of a lamp bulb in series with the power supply to a transistor as a non-linear resistance having a low value of resistance when safe currents are supplied to the transistor and having a high value of resistance when the current supplied to the transistor exceeds the safe limits.

The invention is illustrated in the drawings wherein:

FIG. 1 illustrates an embodiment of this invention used to protect the output power amplifier of a miniature transmitter; and FIG. 2 illustrates the characteristics of a non-linear resistance used as a protective device.

In practicing the invention a non-linear resistance is connected in series with the power supply to the output of a transistor amplifier. The resistance of this non-linear resistance is low when the current flowing through the resistance is within the maximum safe limits of the transistor while the resistance increases when the current to the transistor exceeds a safe value. One practical form of this non-linear resistance can be a light bulb of suitable voltage and current rating. When voltages induced on the antenna by nearby high powered transmitters cause a voltage breakdown of the transistor used in the final amplifier, the non-linear resistance in series with the power supply prevents the current to the transistor from exceeding a safe value by reducing the power supply voltage applied to the transistors.

FIGURE 1 illustrates the invention embodied in a radio transmitter. Audio signals picked up by microphone 1 are amplified in pre-amplifier 2 and further amplified in the amplifier clipper stage 3 which acts to provide instantaneous deviation control. The output of amplifier clipper 3 is integrated in integrating network 4 and applied to the modulator 8 where it is used to modulate the output of oscillator 5. The resulting modulated signal is tripled in first tripler 9 and again in second tripler 10 and then doubled in doubler 11. The resulting modulated carrier signal is amplified in driver 12 and intermediate power amplifier 13 and applied to the final amplifier 16.

The output of the intermediate power amplifier 13 is applied to the final amplifier 16 through tuned circuit 14, which consists of capacitor 15, variable capacitor 19 and inductance 18. Inductance 18 has a center tap which is connected to the base electrodes 26 and 27 of transistors 20 and 21. Transistors 20 and 21 are connected in parallel with their emitter electrodes 24 and 25 connected to ground and their collector electrodes 22 and 23 connected to ground through load resistor 30. The collector electrodes 22 and 23 of transistors 20 and 21 are also connected to the tuned output circuit consisting of capacitors 34, 36, and 37 and coils 35 and 38 and from the tuned circuit to the antenna 39.

Power is furnished to transistors 20 and 21 from a negative power supply through lamp 32 and choke 31 to the collector electrodes 22 and 23 of transistors 20 and 21. The choke 31 and capacitor 33 act as a filter to keep the high frequency energy from the power supply.

To obtain the smallest physical size for the transmitter, the transistors must be operated as efficiently as possible. This requires that the transistors operate near their maximum voltage ratings. In this example the transistors are operated as class B amplifiers and the collector voltage supply is chosen to be a value approximately one-half of the maximum rated voltage of the transistors.

In normal operation the signal from the intermediate power amplifier will drive the transistors to saturation so that the voltage appearing at the collector falls substantially to zero on the negative half cycle of the voltage from the intermediate power amplifier. When the positive half cycle of this voltage is applied to the base electrodes of the transistors 20 and 21, the transistors are cut off but the energy stored in the tuned circuits causes the voltage applied to the collector electrodes to swing to a value equal to approximately twice the quiescent voltage applied to these electrodes. Since this quiescent voltage is approxmiately one-half of the maximum rated voltage of the transistors the voltage applied to the collector electrodes 22 and 23 of the transistors becomes approximately equal to their maximum rating. By operating in this manner the maximum power output can be obtained from the transistors.

However, if the transmitter is operated in the vicinity of a relatively high powered station, such as a transmitter contained in a vehicle which might be operating in the vicinity of the small hand-held transmitter, some of the energy from this nearby transmitter will be picked up by the transmitting antenna and coupled back to the collector electrodes of the power transistors. This voltage adds with the normal RF voltage present at the collector electrodes and is sufficient, in many cases, to cause the transistors to break down. When this break down occurs the transistors draw heavy current, and if this breakdown is repeated for an appreciable number of cycles, the transistors will be destroyed. To prevent this destruction the ballast lamp 32 is included in the power supply circuit to the collector electrodes. This lamp operates as a current limiting device to prevent the transistors from being destroyed because of a current overload.

FIG. 2 illustrates the characteristics of a non-linear resistance of the type used in this invention. The voltage drop across the non-linear resistance is plotted as a function of the current through the non-linear resistance. As can be seen from the curve, as the current through the resistance increases from a value 45 to a value 46 the voltage drop across the resistance increases relatively linearly from value 45 to value 47. As the current increases beyond value 46 the resistance of the non-linear resistance increases and the voltage drop across the resistance becomes very much greater for small increments of current increase. The current increase from value 46 to 48 is less than the increase from value 45 to 46 while voltage drop across the non-linear resistance from values 47 to 49 is greater than the voltage drop across the non-linear resistance from value 45 to 47. In this manner, as the current drawn by the transistor or other device which is to be protected increases the voltage available to the device decreases. This prevents the voltage at the collector of the transistor from building up to a point where it can cause excessively high current flow through the transistor if voltage breakdown occurs.

An example of a non-linear resistance having suitable characteristics would be an incandescent lamp. The lamp should be chosen so that the normal current drawn by the transistors would not change the resistance of the lamp appreciably while the maximum current of which the transistor is capable of handling should increase the resistance of the lamp to the point where the voltage drop across the lamp will be nearly equal to the power supply voltage. The knee of the curve, point A to point B should be as sharp as possible. An example of a lamp suitable for use in a small hand-held transmitter would be a type 43.

As can be seen from the curve of FIG. 2 when the current drawn by the transistors is in the normal operating range from point 0 to point A the voltage drop across the lamp is low and thus the lamp does not affect the operation of the transmitter. When the current drawn by the transistors begins to reach a danger point, the voltage drop across the lamp increases more rapidly until as point B is reached a further increase in current through the lamp will cause a large voltage drop across the lamp. This large voltage drop across the lamp reduces the voltage at the collector electrodes 22 and 23 and changes the operating point of the transistor so that the alternating voltage output of the transistor will be reduced. This reduced voltage output from the transistors will be low enough to limit the current through the transistors to a safe value even if an interfering signal causes the transistor to break down.

Thus a non-linear resistance in series with the power supply to the power amplifier transistor prevents the destruction of the transistor by limiting the current and reducing the supply voltage applied to it when the voltage at its output increases beyond a safe operating point because of the presence of a strong interfering signal.

I claim:

1. A transistor output circuit including in combination a transistor having input and output circuit means, antenna circuit means, said output circuit means applying first signals to said antenna circuit means for radiation thereby, said antenna circuit means being susceptible to picking up second signals from other transmitters which may be present and applying said second signals to said output circuit means, whereby said first and second signals add to produce a voltage greater than the breakdown voltage of said transistor causing said transistor to break down and power supply means including transistor protecting means for applying energy to said transistor, said transistor protecting means including an electric lamp through which current flows to said transistor, said lamp operating to limit the current supplied to said transistor whereby said output circuit means continues to apply said first signal to said antenna circuit means without damage to said transistor.

2. In a carrier wave transmitter, a transistor circuit including in combination, at least one transistor having base emitter, and collector electrodes, said emitter electrode being connected to a reference potential, driving means connected to said base electrode to supply a first alternating current signal thereto, antenna circuit means connected to said collector electrode, said collector electrode applying signals to said antenna circuit means for radiation thereby, said antenna circuit means being susceptible to picking up second alternating current signals from other transmitters which may be present and applying the same to said collector electrode whereby said first and second signals add to produce a voltage greater than the breakdown voltage of said transistor causing said transistor to break down, and power supply means including electric lamp means connecting said power supply means to said collector electrode to limit the current supplied thereto during said voltage breakdown whereby said collector electrode continues to apply said first signal to said antenna circuit means without damage to said transistor.

3. In a carrier wave transmitter, a transistor protection circuit including in combination, first and second transistors having base, emitter and collector electrodes, said emitter electrodes being connected to a common reference potential, driving means connected to said base electrodes to supply a first alternating current thereto, antenna circuit means connected to said collector electrodes, said collector electrodes applying signals to said antenna circuit means for radiation thereby, and said antenna circuit means being susceptible to picking up second alternating current signals from other transmitters which may be present and applying the same to said collector electrodes whereby said first and second signals add to produce a voltage greater than the breakdown voltage of said transistors causing said transistors to break down, power supply means including a non-linear resistance element connecting said power supply means to said collector electrodes, said non-linear resistance elements having a resistance characteristic such that the resistance increases as the current flowing through said non-linear element increases to thereby limit the current supplied to said collector electrodes during said voltage breakdown whereby said collector electrodes continue to apply signals to said antenna circuit means without damage to said first and second transistors.

References Cited by the Examiner

UNITED STATES PATENTS

| | | | |
|---|---|---|---|
| 1,585,450 | 5/1926 | Whelan | 325—362 X |
| 2,924,778 | 2/1960 | Barton | 330—15 |
| 3,015,781 | 1/1962 | Eklov | 330—15 |
| 3,068,423 | 12/1962 | Hultberg | 330—15 X |
| 3,101,453 | 8/1963 | Simpson et al. | 330—15 XR |
| 3,110,863 | 11/1963 | Weidknecht et al. | 325—105 |

DAVID G. REDINBAUGH, *Primary Examiner.*

J. W. CALDWELL, *Assistant Examiner.*